US010922021B2

(12) United States Patent
Hsieh et al.

(10) Patent No.: US 10,922,021 B2
(45) Date of Patent: Feb. 16, 2021

(54) DATA STORAGE METHOD BASED ON DATA TYPE IDENTIFICATION, MEMORY STORAGE APPARATUS AND MEMORY CONTROL CIRCUIT UNIT

(71) Applicant: PHISON ELECTRONICS CORP., Miaoli (TW)

(72) Inventors: Yi-Chang Hsieh, New Taipei (TW); Che-Wei Chang, Yilan County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 16/395,259

(22) Filed: Apr. 26, 2019

(65) Prior Publication Data
US 2020/0293225 A1   Sep. 17, 2020

(30) Foreign Application Priority Data

Mar. 12, 2019 (TW) ................................. 108108134

(51) Int. Cl.
   *G06F 3/06*    (2006.01)
   *G06F 12/10*   (2016.01)

(52) U.S. Cl.
   CPC .......... *G06F 3/0659* (2013.01); *G06F 3/0604* (2013.01); *G06F 3/0652* (2013.01);
   (Continued)

(58) Field of Classification Search
   None
   See application file for complete search history.

(56) References Cited

U.S. PATENT DOCUMENTS

2014/0372675 A1* 12/2014 Higeta ................ G06F 12/0246
                                                          711/103
2015/0227316 A1*  8/2015 Warfield ................ G06F 3/065
                                                          711/103
(Continued)

FOREIGN PATENT DOCUMENTS

TW      I454916      10/2014
TW      I597605       9/2017

OTHER PUBLICATIONS

Chiang, M.-L., Lee, P.C.H. and Chang, R.-C. (1999), Using data clustering to improve cleaning performance for flash memory. Softw: Pract. Exper., 29: 267-290. doi:10.1002/(SICI)1097-024X(199903)29:3<267::AID-SPE233>3.0.CO;2-T (Year: 1999).*

(Continued)

*Primary Examiner* — Edward J Dudek, Jr.
*Assistant Examiner* — Ralph A Verderamo, III
(74) *Attorney, Agent, or Firm* — JCIPRNET

(57) ABSTRACT

The disclosure provides a data storage method, a memory storage apparatus, and a memory control circuit unit. The method includes: allocating logical addresses to be mapped to physical programming units of physical erasing units; grouping the logical addresses into logical address groups; receiving write commands and data to be stored into the logical addresses; writing the data into the physical programming units; recording a data write timestamp of each of the physical erasing units; recording a bit sum of each of the logical address groups; and identifying the data belonging to the first logical address group as cold data if the bit sum of a first logical address group is less than a bit sum threshold value and the data write timestamp of the physical erasing units writing data belonging to the first logical address group is less than a timestamp threshold value.

20 Claims, 9 Drawing Sheets

(52) U.S. Cl.
CPC ............ *G06F 3/0679* (2013.01); *G06F 12/10* (2013.01); *G06F 2212/657* (2013.01)

(56) References Cited

U.S. PATENT DOCUMENTS

| | | | | |
|---|---|---|---|---|
| 2015/0347041 | A1* | 12/2015 | Kotte | G06F 3/064 |
| | | | | 711/103 |
| 2016/0179406 | A1* | 6/2016 | Gorobets | G11C 11/5628 |
| | | | | 711/103 |
| 2016/0188459 | A1* | 6/2016 | Kanno | G06F 12/0246 |
| | | | | 711/103 |
| 2018/0024920 | A1* | 1/2018 | Thomas | G06F 12/0246 |
| | | | | 711/103 |
| 2019/0179741 | A1* | 6/2019 | Liu | G06F 12/0246 |
| 2019/0294341 | A1* | 9/2019 | Sunata | G06F 3/0608 |
| 2020/0089603 | A1* | 3/2020 | Jin | G06F 3/0679 |
| 2020/0097403 | A1* | 3/2020 | Saxena | G06F 12/0269 |

OTHER PUBLICATIONS

Mei-Ling Chiang, P. C. H. Lee and Ruei-Chuan Chang, "Managing flash memory in personal communication devices," ISCE '97. Proceedings of 1997 IEEE International Symposium on Consumer Electronics (Cat. No. 97TH8348), Singapore, 1997, pp. 177-182. (Year: 1997).*

"Office Action of Taiwan Counterpart Application", dated May 13, 2020, p. 1-p. 6.

\* cited by examiner

FIG. 7

DATA STORAGE METHOD BASED ON DATA TYPE IDENTIFICATION, MEMORY STORAGE APPARATUS AND MEMORY CONTROL CIRCUIT UNIT

CROSS-REFERENCE TO RELATED APPLICATION

This application claims the priority benefit of Taiwan application serial no. 108108134, filed on Mar. 12, 2019. The entirety of the above-mentioned patent application is hereby incorporated by reference herein and made a part of this specification.

BACKGROUND

Technology Field

The disclosure relates to a data storage method for a rewritable non-volatile memory module and a memory storage apparatus using the method and a memory control circuit unit.

Description of Related Art

The markets of digital cameras, cellular phones, and MP3 players have expanded rapidly in recent years, resulting in escalated demand for storage media by consumers. The characteristics of data non-volatility, low power consumption, compact size, and no mechanical structure make the rewritable non-volatile memory module (e.g., flash memory) ideal for being built in the portable multi-media devices as cited above.

Generally, if the stored data can be identified whether to be cold data which is not frequently updated, operations such as garbage collection may be performed more effectively. Therefore, how to identify cold data and hot data in the rewritable non-volatile memory module and effectively increase efficiency of accessing the cold data is an important issue in this field.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The disclosure provides a data storage method, a memory storage apparatus, and a memory control circuit unit.

An exemplary embodiment of the disclosure provides a data storage method configure for a rewritable non-volatile memory module having a plurality of physical erasing units. The data storage method includes: allocating a plurality of logical addresses to be mapped to a plurality of physical programming units of the physical erasing units; grouping the logical addresses into a plurality of logical address groups; receiving a plurality of write commands and a plurality of pieces of data to be stored into the logical addresses from a host system; and writing the data into the physical programming units of the physical erasing units respectively. In addition, the data storage method further includes: identifying data of the physical erasing unit of a first logical address group among the logical address groups is a first type data according to a data write timestamp of each of the physical erasing units and a bit sum of the physical erasing units in each of the logical address groups.

An exemplary embodiment of the disclosure provides a memory control circuit unit configured for a rewritable non-volatile memory module. The memory control circuit unit includes a host interface, a memory interface, and a memory management circuit. The host interface is coupled to a host system. The memory interface is configured to be coupled to the rewritable non-volatile memory module, and the rewritable non-volatile memory module has a plurality of physical erasing units. The memory management circuit is coupled to the host interface and the memory interface. Herein, the memory management circuit is configured to allocate a plurality of logical addresses to be mapped to a plurality of physical programming units of the physical erasing units and group the logical addresses into a plurality of logical address groups. In addition, the memory management circuit is configured to receive a plurality of write commands and a plurality of pieces of data to be stored to the logical addresses from the host system and writes the data into the physical programming units of the physical erasing units respectively. Further, the memory management circuit is configured to identify data of the physical erasing unit of a first logical address group among the logical address groups is a first type data according to a data write timestamp of each of the physical erasing units and a bit sum of the physical erasing units in each of the logical address groups.

An exemplary embodiment of the disclosure provides a memory storage apparatus including a connection interface unit, a rewritable non-volatile memory module, and a memory control circuit unit. The connection interface unit is coupled to a host system. The rewritable non-volatile memory module has a plurality of physical erasing units. The memory control circuit unit is coupled to the connection interface unit and the rewritable non-volatile memory module. Herein, the memory control circuit unit is configured to allocate a plurality of logical addresses to be mapped to a plurality of physical programming units of the physical erasing units, group the logical addresses into a plurality of logical address groups, receive a plurality of write commands and a plurality of pieces of data to be stored into the logical addresses from a host system, and write the data into the physical programming units of the physical erasing units respectively. In addition, the memory control circuit unit is configured to identify data of the physical erasing unit of a first logical address group among the logical address groups is a first type data according to a data write timestamp of each of the physical erasing units and a bit sum of the physical erasing units in each of the logical address groups.

Based on the above, the disclosure provides a data storage method, a memory storage apparatus, and a memory control circuit unit. In the method, the stored data is identified whether to be the first type data according to the bit sums of the logical address groups and the data write timestamps of the physical erasing units. The data reorganization operation is then activated for the first type data so as to gather the first type data, and in this way, the following operation of data reading is accelerated, and efficiency of data accessing is effectively increased.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 7 is a schematic diagram illustrating establishment of a logical address group bit map according to an exemplary embodiment of the invention.

DESCRIPTION OF THE EMBODIMENTS

Figure 1:
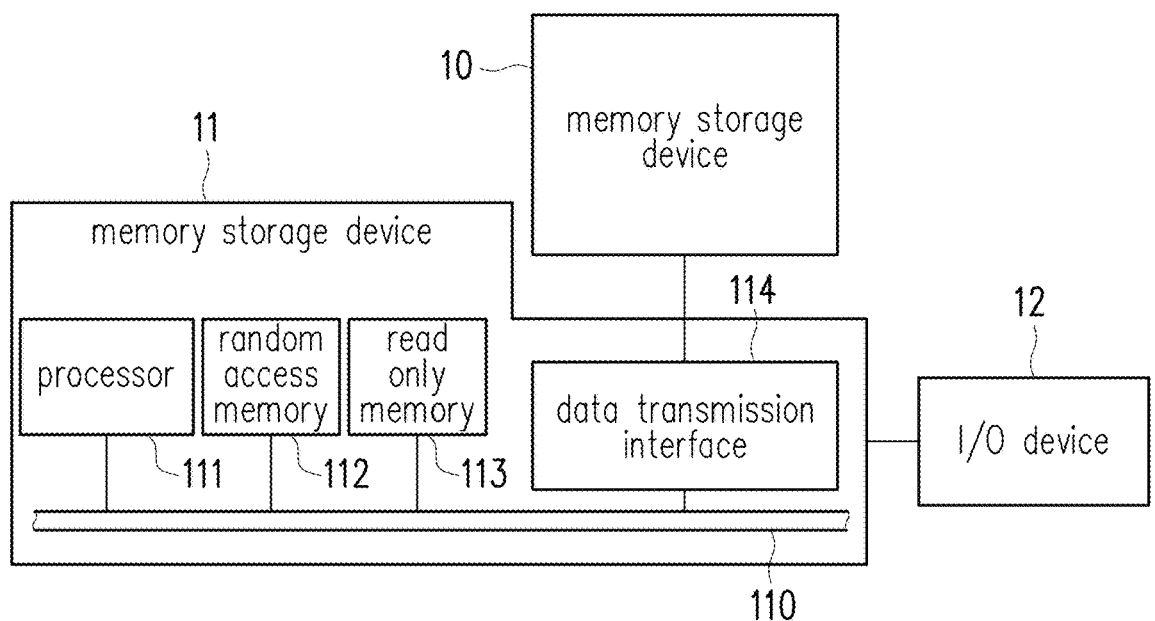
FIG. 1 is a schematic diagram illustrating a host system, a memory storage device, and an input/output (I/O) device according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also called as a memory storage system) includes a rewritable non-volatile memory module and a controller (also called as a control circuit unit). The memory storage device is usually configured together with a host system so that the host system may write data into the memory storage device or read data from the memory storage device.

Figure 2:
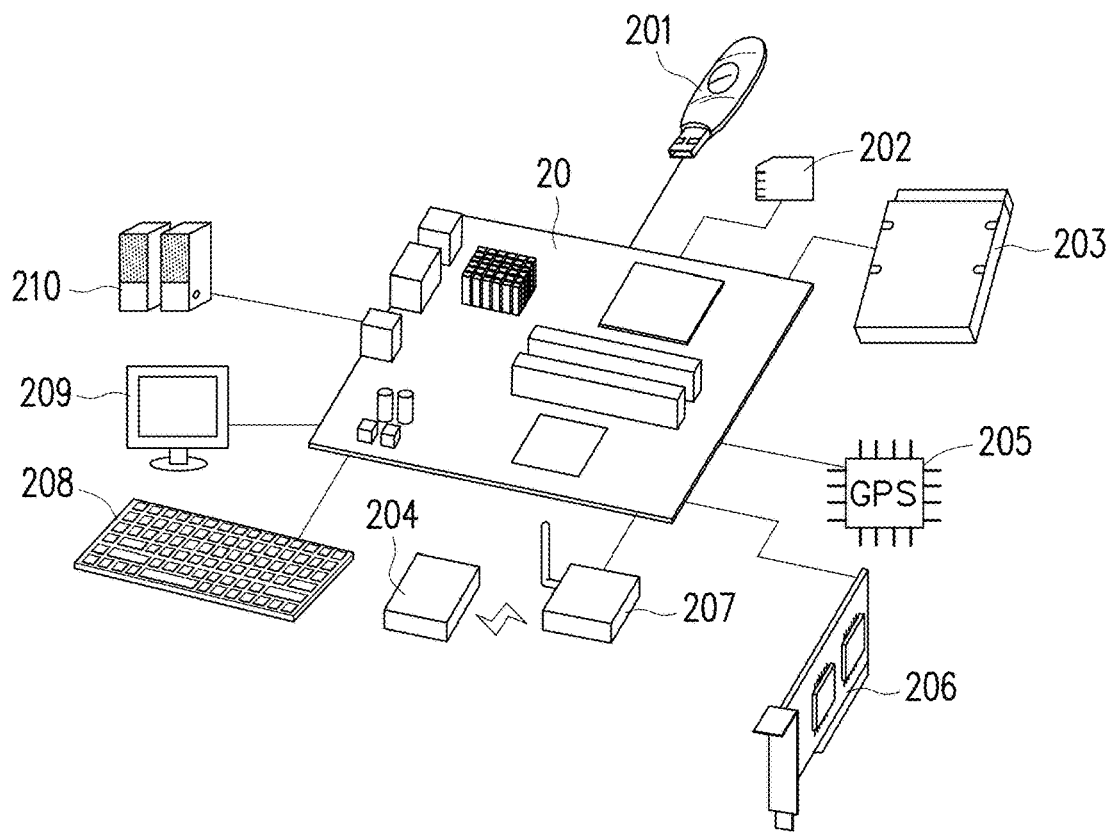
FIG. 2 is a schematic diagram illustrating a host system, a memory storage device, and an I/O device according to another exemplary embodiment of the disclosure.

FIG. 1 is a schematic diagram illustrating a host system, a memory storage device, and an input/output (I/O) device according to an exemplary embodiment of the disclosure. FIG. 2 is a schematic diagram illustrating a host system, a memory storage device, and an I/O device according to another exemplary embodiment of the disclosure.

Referring to FIG. 1 and FIG. 2 together, a host system 11 generally includes a processor 111, a random access memory (RAM) 112, a read only memory (ROM) 113, and a data transmission interface 114. The processor 111, the random access memory 112, the read only memory 113, and the data transmission interface 114 are all coupled to a system bus 110.

In this exemplary embodiment, the host system 11 is coupled to a memory storage device 10 through the data transmission interface 114. For instance, the host system 11 is able to store data into the memory storage device 10 or read data from the memory storage device 10 through the data transmission interface 114. Further, the host system 11 is coupled to an I/O device 12 through the system bus 110. For example, the host system 11 can transmit an output signal to the I/O device 12 or receive an input signal from the I/O device 12 through the system bus 110.

In this exemplary embodiment, the processor 111, the random access memory 112, the read only memory 113, and the data transmission interface 114 may be disposed on a mainboard 20 of the host system 11. The number of the data transmission interface 114 may be one or plural. The main board 20 may be coupled to the memory storage apparatus 10 by wired or wireless means through the data transmission interface 114. The memory storage device 10 may be, for example, a flash drive 201, a memory card 202, a solid state drive (SSD) 203, or a wireless memory storage device 204. The wireless memory storage device 204 may be, for example, a memory storage device based on various wireless communication technologies, such as a near field communication (NFC) memory storage device, a wireless fidelity (WiFi) memory storage device, a bluetooth memory storage device, or a low energy bluetooth memory storage device (e.g., iBeacon). Besides, the mainboard 20 may also be coupled to various I/O devices including a global positioning system (GPS) module 205, a network interface card 206, a wireless transmission device 207, a keyboard 208, a monitor 209, and a speaker 210 through the system bus 110. For example, in an exemplary embodiment, the mainboard 20 can access the wireless memory storage device 204 through the wireless transmission device 207.

Figure 3:
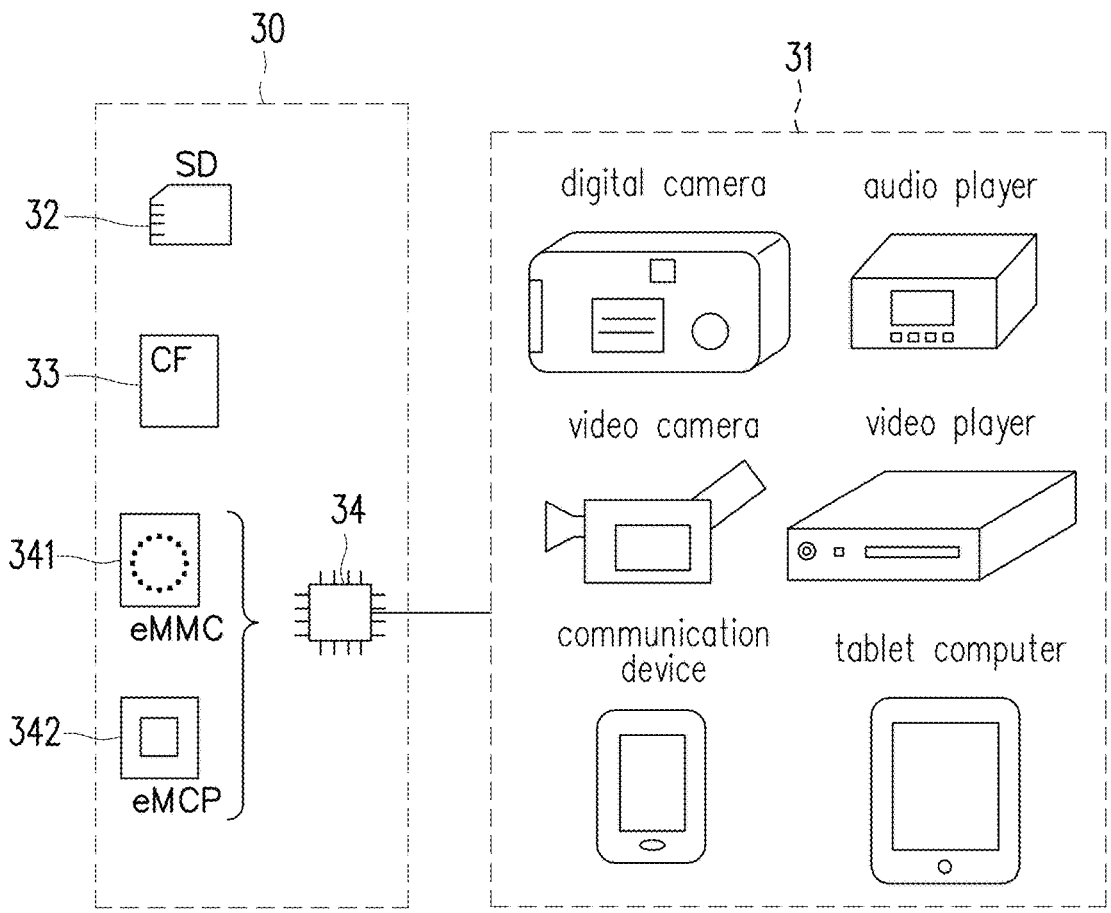
FIG. 3 is a schematic diagram illustrating a host system and a memory storage device according to another exemplary embodiment of the disclosure.

In an exemplary embodiment, the host system mentioned may be any systems capable of substantially cooperating with the memory storage device for storing data. Although the host system is illustrated as a computer system in the foregoing exemplary embodiment; nevertheless, FIG. 3 is a schematic diagram illustrating a host system and a memory storage device according to another exemplary embodiment of the disclosure. Referring to FIG. 3, in another exemplary embodiment, a host system 31 may also be a system including a digital camera, a video camera, a communication device, an audio player, a video player, or a tablet computer, whereas a memory storage device 30 can be various non-volatile memory storage devices used by the host system 31, such as a secure digital (SD) card 32, a compact flash (CF) card 33, or an embedded storage device 34. The embedded storage device 34 includes various embedded storage devices capable of directly coupling a memory module onto a substrate of the host system, such as an embedded Multi Media Card (eMMC) 341 and/or an embedded Multi Chip Package (eMCP) storage device 342.

Figure 4:
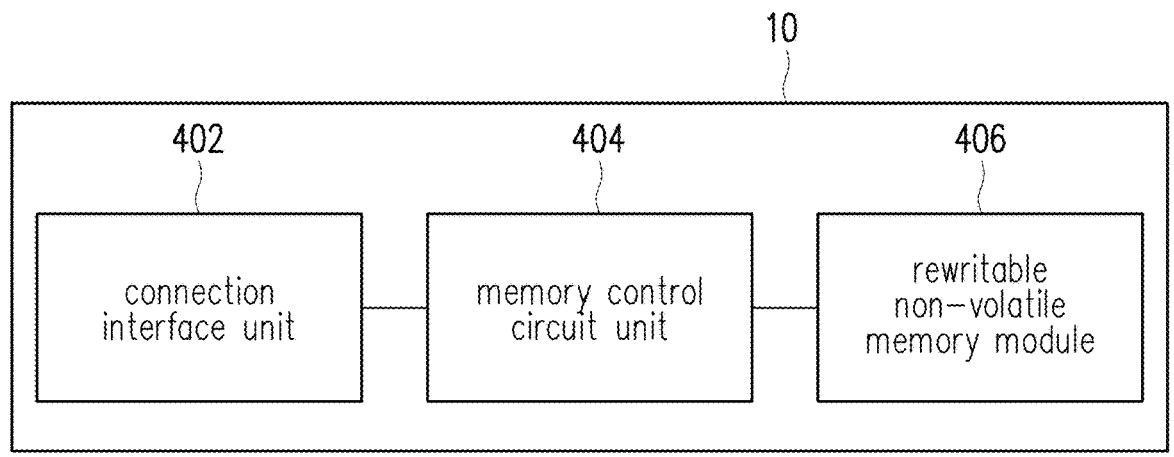
FIG. 4 is a schematic block diagram illustrating a memory storage device according to an exemplary embodiment of the disclosure.

FIG. 4 is a schematic block diagram illustrating a memory storage device according to an exemplary embodiment of the disclosure.

Referring to FIG. 4, the memory storage device 10 includes a connection interface unit 402, a memory control circuit unit 404, and a rewritable non-volatile memory module 406.

The connection interface unit 402 is configured to couple the memory storage device 10 to the host system 11. In this exemplary embodiment, the connection interface unit 402 is compatible with a Serial Advanced Technology Attachment (SATA) standard. However, it should be noted that the disclosure is not limited thereto, and the connection interface unit 402 may also comply with the Parallel Advanced Technology Attachment (PATA) standard, the Institute of Electrical and Electronic Engineers (IEEE) 1394 standard, the Peripheral Component Interconnect Express (PCI Express) standard, the Universal Serial Bus (USB) standard, the Secure Digital (SD) interface standard, the Ultra High Speed-I (UHS-I) interface standard, the Ultra High Speed-II (UHS-II) interface standard, the Memory Stick (MS) interface standard, the Multi Media Card (MMC) interface standard, the Embedded Multimedia Card (eMMC) interface standard, the Universal Flash Storage (UFS) interface standard, the Compact Flash (CF) interface standard, the Integrated Device Electronics (IDE) interface standard, or other suitable standards. The connection interface unit 402 may be packaged in a chip together with the memory control circuit unit 404, or the connection interface unit 402 may be disposed outside a chip including the memory control circuit unit 404.

The memory control circuit unit 404 is configured to execute a plurality of logic gates or control instructions which are implemented in form of hardware or firmware and to execute operations of writing, reading or erasing data in the rewritable non-volatile memory module 406 according to the commands of the host system 11.

The rewritable non-volatile memory module 406 is coupled to the memory control circuit unit 404 and is configured to store data written by the host system 11. The rewritable non-volatile memory module 406 may be a single level cell (SLC) NAND flash memory module (i.e., a flash memory module in which one memory cell stores 1 bit of data), a multi level cell (MLC) NAND flash memory module (i.e., a flash memory module in which one memory cell stores 2 bits of data), a triple level cell (TLC) NAND flash memory module (i.e., a flash memory module in which one memory cell stores 3 bits of data), other types of flash memory modules, or other memory modules having the same characteristics.

Each memory cell in the rewritable non-volatile memory module 406 stores one bit or more bits by change of a voltage (referred to as "threshold voltage" hereinafter). Specifically, a charge trapping layer exists between a control gate of each memory cell and a channel. By applying a write voltage to the control gate, an electron amount of the charge trapping layer is changed, and thereby changing the threshold voltage of the memory cell. The operation of changing the threshold voltage of the memory cell is also called "writing data to the memory cell" or "programming the memory cell". Each memory cell in the rewritable non-volatile memory module 406 has a plurality of storage states according to the change of the threshold voltage. The storage state of the memory cell can be determined by applying a reading voltage, and thereby, obtaining the one or more bits stored in the memory cell.

In this exemplary embodiment, the memory cells of the rewritable non-volatile memory module 406 can constitute a plurality of physical programming units, and the physical programming units can constitute a plurality of physical erasing units. Specifically, the memory cells on the same word line form one physical programming unit or a plurality of physical programming units. If each of the memory cells stores 2 bits or more bits, the physical programming units on the same word line may at least be categorized as a lower physical programming unit and an upper physical programming unit. For instance, a least significant bit (LSB) of one memory cell belongs to the lower physical programming unit, and a most significant bit (MSB) of one memory cell belongs to the upper physical programming unit. Generally, in a MLC NAND flash memory module, a writing speed of the lower physical programming unit may be greater than a writing speed of the upper physical programming unit, and/or reliability of the lower physical programming unit is greater than reliability of the upper physical programming unit.

In this exemplary embodiment, the physical programming unit is the smallest unit for programming. That is, the physical programming unit is the minimum unit for writing data. For example, the physical programming unit is the physical page or a physical sector. If the physical programming unit is the physical page, the physical programming units usually include a data bit region and a redundant bit region. The data bit region includes a plurality of physical sectors for storing user data, and the redundant bit region is configured for storing system data (e.g., management data such as an error correcting code). In this exemplary embodiment, the data bit region includes 32 physical sectors, and the size of each of the physical sectors is 512 bytes (B). However, in other exemplary embodiments, the data bit region may include 8, 16, or more or fewer physical sectors. A size of each of the physical sectors may be greater or smaller. On the other hand, the physical erasing unit is the minimum unit for erasing. Namely, each physical erasing unit contains the least number of memory cells to be erased together. The physical erasing unit is a physical block, for example.

Figure 5:
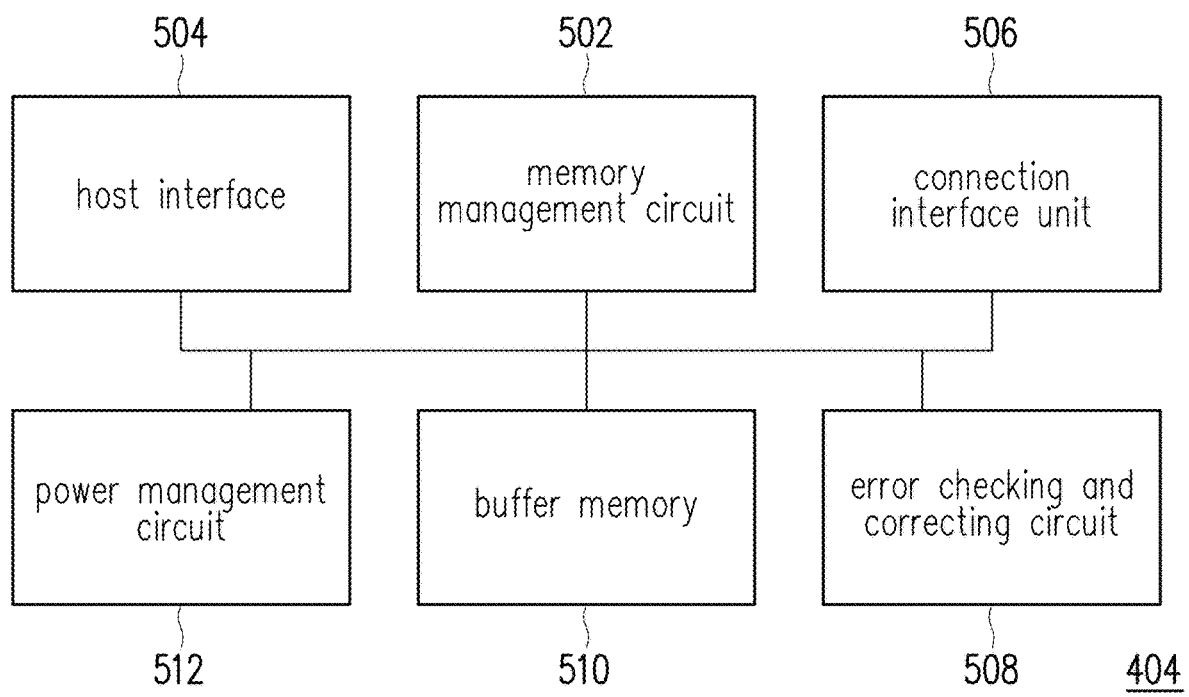
FIG. 5 is a schematic block diagram illustrating a memory control circuit unit according to an exemplary embodiment of the disclosure.

FIG. 5 is a schematic block diagram illustrating a memory control circuit unit according to an exemplary embodiment of the disclosure.

Referring to FIG. 5, the memory control circuit unit 404 includes a memory management circuit 502, a host interface 504, and a memory interface 506.

The memory management circuit 502 is configured to control overall operations of the memory control circuit unit 404. Specifically, the memory management circuit 502 has a plurality of control commands. When the memory storage apparatus 10 operate, the control commands are executed to perform various operations such as data writing, data reading, and data erasing. The following description of the operation of the memory management circuit 502 is equivalent to the description of the operation of the memory control circuit unit 404.

In this exemplary embodiment, the control instructions of the memory management circuit 502 are implemented in form of firmware. For instance, the memory management circuit 502 has a microprocessor unit (not shown) and a read-only memory (not shown), and the control commands are burnt into the read-only memory. When the memory storage device 10 is operated, the control commands are executed by the microprocessor unit for performing various data operations, such as data writing, data reading, and data erasing.

In another exemplary embodiment, the control commands of the memory management circuit 502 may also be stored in a specific region (for example, a system region in the memory module exclusively used for storing system data) of the rewritable non-volatile memory module 406 in the form of program codes. Moreover, the memory management circuit 502 has the microprocessor unit (not shown), the read-only memory (not shown), and a random access memory (not shown). In particular, the read-only memory has a boot code. When the memory control circuit unit 404 is enabled, the boot code is first executed by the microprocessor unit for loading the control commands stored in the rewritable non-volatile memory module 406 to the random access memory of the memory management circuit 502. Afterwards, the microprocessor unit executes the control commands for various data operations such as data writing, data reading, and data erasing.

In addition, in another exemplary embodiment, the control commands of the memory management circuit 502 may be implemented in a hardware form. For example, the memory management circuit 502 includes a microprocessor, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microprocessor. The memory management circuit is configured to manage the memory cells or the memory cell groups of the rewritable non-volatile memory module 406. The memory writing circuit is configured to issue a write command sequence to the rewritable non-volatile memory module 406 so as to write data into the rewritable non-volatile memory module 406. The memory reading circuit is configured to issue a read command sequence to the rewritable non-volatile memory module 406 so as to read data from the rewritable non-volatile memory module 406. The memory erasing circuit is configured to issue an erase command sequence to the rewritable non-volatile memory module 406 so as to erase data from the rewritable non-volatile memory module 406. The data processing circuit is configured to process data to be written into the rewritable non-volatile memory module 406 and data to be read from the rewritable non-volatile memory module 406. The write command sequence, the read command sequence, and the erase command sequence may respectively include one or more program codes or command codes and are configured to instruct the rewritable non-volatile memory module 406 to execute corresponding data operations such as data writing, data reading, and data erasing. In an exemplary embodiment, the memory management circuit 502 can further issue other types of command sequences to the rewritable non-volatile memory module 406 for instructing to execute corresponding operations.

The host interface 504 is coupled to the memory management circuit 502 and is configured for receiving and identifying commands and data sent from the host system 11. In other words, the commands and the data sent from the host system 11 are transmitted to the memory management circuit 502 through the host interface 504. In this exemplary embodiment, the host interface 504 is compatible to the SATA standard. However, it should be understood that the disclosure is not limited thereto, and the host interface 504 may also be compatible to a PATA standard, an IEEE 1394 standard, a PCI Express standard, a USB standard, a SD standard, a UHS-I standard, a UHS-II standard, a MS standard, a MMC standard, an eMMC standard, a UFS standard, a CF standard, an IDE standard, or other suitable standards for data transmission.

The memory interface 506 is coupled to the memory management circuit 502 and is configured to access the rewritable non-volatile memory module 406. In other words, data to be written to the rewritable non-volatile memory module 406 is converted into a format acceptable to the rewritable non-volatile memory module 406 through the memory interface 506. Specifically, when the memory management circuit 502 is to access the rewritable non-volatile memory module 406, the memory interface 506 sends corresponding command sequences. For instance, the command sequences may include a write command sequence instructing data-writing, a read command sequence instructing data-reading, an erasing command sequence instructing data-erasing, and corresponding command sequences configured for instructing various memory operations (e.g., changing reading voltage levels or executing garbage collection, etc.). The command sequences are, for example, generated by the memory management circuit 502 and sent to the rewritable non-volatile memory module 406 through the memory interface 506. The command sequences may include one or more signals or data on the bus. The signals or the data may include command codes and program codes. For example, information such as identification codes and memory addresses are included in the read command sequence.

In an exemplary embodiment, the memory control circuit unit 404 further includes an error checking and correcting circuit 508, a buffer memory 510, and a power management circuit 512.

The error checking and correcting circuit 508 is coupled to the memory management circuit 502 and is configured to execute an error checking and correcting operation to ensure the correctness of data. To be more specific, when the memory management circuit 502 receives a write command from the host system 11, the error checking and correcting circuit 508 generates a corresponding error correcting (ECC) code and/or an error detecting code (EDC) for the data corresponding to the write command, and the memory management circuit 502 writes the data corresponding to the write command and the corresponding error correcting code and/or the error detecting code to the rewritable non-volatile memory module 406. Afterward, when the memory management circuit 502 reads the data from the rewritable non-volatile memory module 406, the corresponding error correcting code and/or the error detecting code is also read simultaneously, and the error checking and correcting circuit 508 executes error checking and correcting operations for the read data based on the error correcting code and/or the error detecting code.

The buffer memory 510 is coupled to the memory management circuit 502 and is configured to temporarily store data and commands from the host system 11 or data from the rewritable non-volatile memory module 406. The power management unit 512 is coupled to the memory management circuit 502 and is configured to control power of the memory storage device 10.

Figure 6:
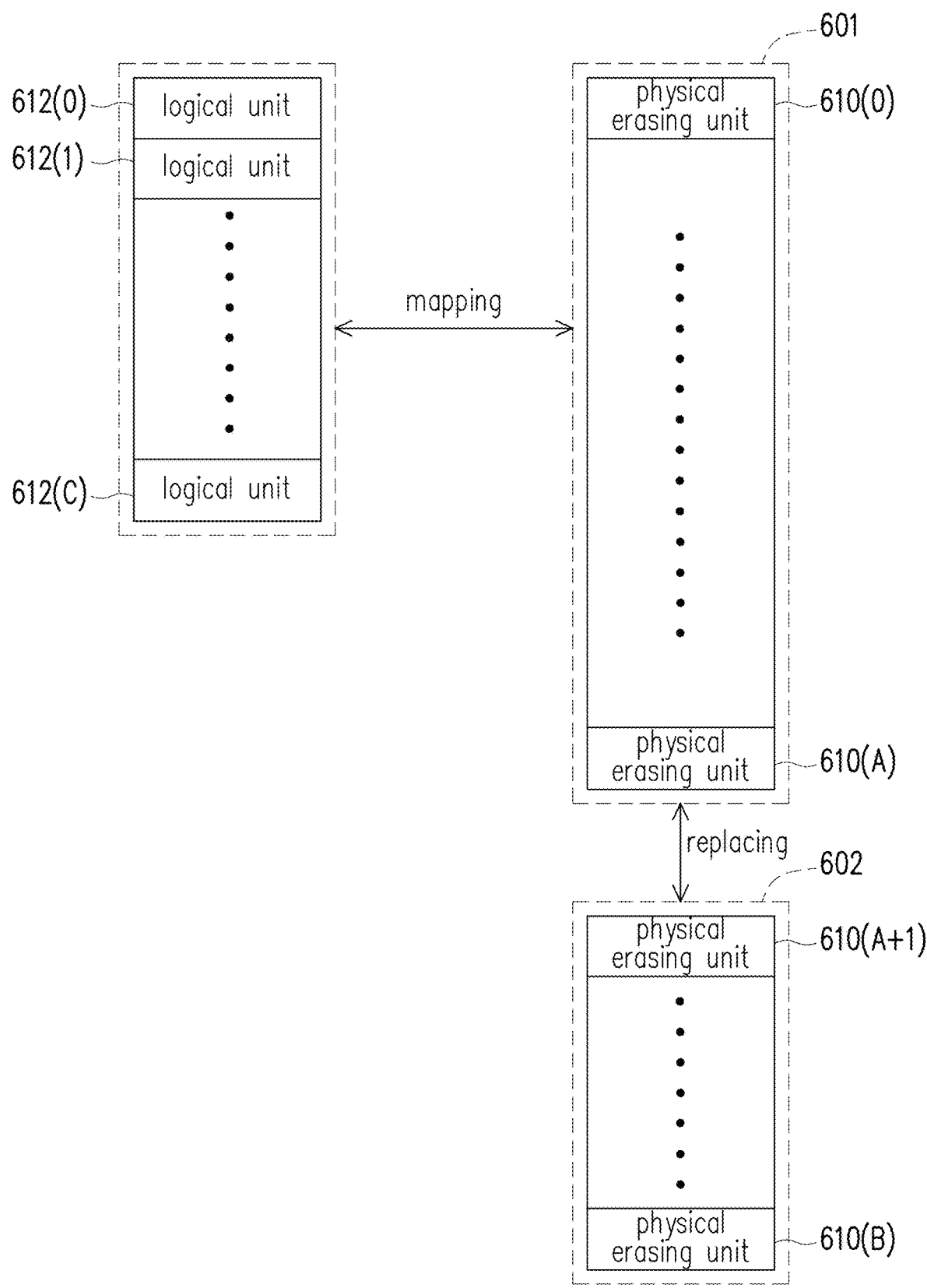
FIG. 6 is a schematic diagram illustrating management of a rewritable non-volatile memory module according to an exemplary embodiment of the disclosure.

FIG. 6 is a schematic diagram illustrating management of a rewritable non-volatile memory module according to an exemplary embodiment of the disclosure.

It should be noted that in the following exemplary embodiments, terms, such as "select", "group" and so forth, are logical concepts which describe management in the physical erasing units of the rewritable non-volatile memory module 406. In other words, the physical erasing units of the rewritable non-volatile memory module 406 are logically operated so actual positions of the physical units of the rewritable non-volatile memory module 406 are not changed.

Referring to FIG. 6, the memory management circuit 502 groups physical erasing units 610(0) to 610(B) of the rewritable non-volatile memory module 406 into a storage region 601 and a spare region 602. For instance, the physical erasing units 610(0) to 610(A) belong to the storage region 601, and the physical erasing units 610(A+1) to 610(B) belong to the spare region 602. In this exemplary embodiment, one physical erasing unit refers to one physical erasing unit. Nevertheless, in another exemplary embodiment, one physical erasing unit may include a plurality of physical erasing units. In addition, the memory management circuit 502 may associate one physical erasing unit to one of the storage region 601 and the spare region 602 through methods such as marking.

During the operation of the memory storage device 10, the association of one physical erasing unit to the storage region 601 or the spare region 602 may vary dynamically. For instance, when receiving write data from the host system 11, the memory management circuit 502 selects one physical erasing unit from the spare region 602 to store at least a portion of data of the write data and associates this physical erasing unit to the storage region 601. In addition, after erasing one physical erasing unit belonging to the storage region 601 to clear data in the physical erasing unit, the memory management circuit 502 associates the erased physical erasing unit to the spare region 602.

In this exemplary embodiment, each of the physical erasing units belonging to the spare region 602 is called as a spare physical erasing unit, and each of the physical erasing units belonging to the storage region 601 is called as a non-spare physical erasing unit. Each of the physical erasing units belonging to the spare region 602 is an erased physical erasing unit and does not store any data, and each of the physical erasing units belonging to the storage region 601 stores data. Further, each of the physical erasing units belonging to the spare region 602 does not store any valid data, and each of the physical erasing units belonging to the storage region 601 may store valid and/or invalid data.

In an exemplary embodiment, the memory management circuit 502 allocates logical units 612(0) to 612(C) to be mapped to the physical erasing units in the storage region 601. In this exemplary embodiment, the host system 11 accesses the physical erasing units belonging to the storage region 601 through logical addresses (LAs). Therefore, each logical unit among the logical units 612(0) to 612(C) refers to one logical address. Nevertheless, in another exemplary embodiment, each logical unit among the logical units 612(0) to 612(C) may also refer to one logical programming unit, one logical erasing unit, or may be composed of a plurality of consecutive or inconsecutive logical addresses. In addition, each logical unit among the logical units 612(0) to 612(C) may be mapped to one or more physical erasing units.

In this exemplary embodiment, the memory management circuit 502 records a mapping relationship (also called as a logical-physical mapping relationship) between the logical units and the physical erasing units in at least one logical-physical mapping table. When the host system 11 intends to read data from the memory storage device 10 or to write data to the memory storage device 10, the memory management circuit 502 may perform data access of the memory storage device 10 according to the at least one logical-physical mapping table.

In this exemplary embodiment, the valid data is the latest data belonging to one logical unit, and the invalid data is not the latest data belonging to any of the logical units. For instance, if the host system 11 stores new data into one logical unit and overwrites old data previously stored in this logical unit (i.e., updates data belonging to this logical unit), this new data stored in the storage region 601 is the latest data belonging to this logical unit and is marked as valid, and the overwritten old data may still be stored in the storage region 601 but is marked as invalid. In this exemplary embodiment, if data belonging to one logical unit is updated, the mapping relationship between this logical unit and the physical erasing unit storing the old data belonging to this logical unit is removed, and a mapping relationship between this logical unit and the physical erasing unit storing the latest data belonging to this logical unit is established.

It is noted that in the following description, some terms may be replaced with corresponding abbreviations for ease of reading (see Table 1).

TABLE 1

| rewritable non-volatile memory module | RNVM module |
|---|---|
| physical erasing unit | PEU |
| physical programming unit | PPU |
| logical address group | LAG |
| logical address | LA |
| memory management circuit | MMC |
| write mark | WM |
| write timestamp | WT |

Figure 7:
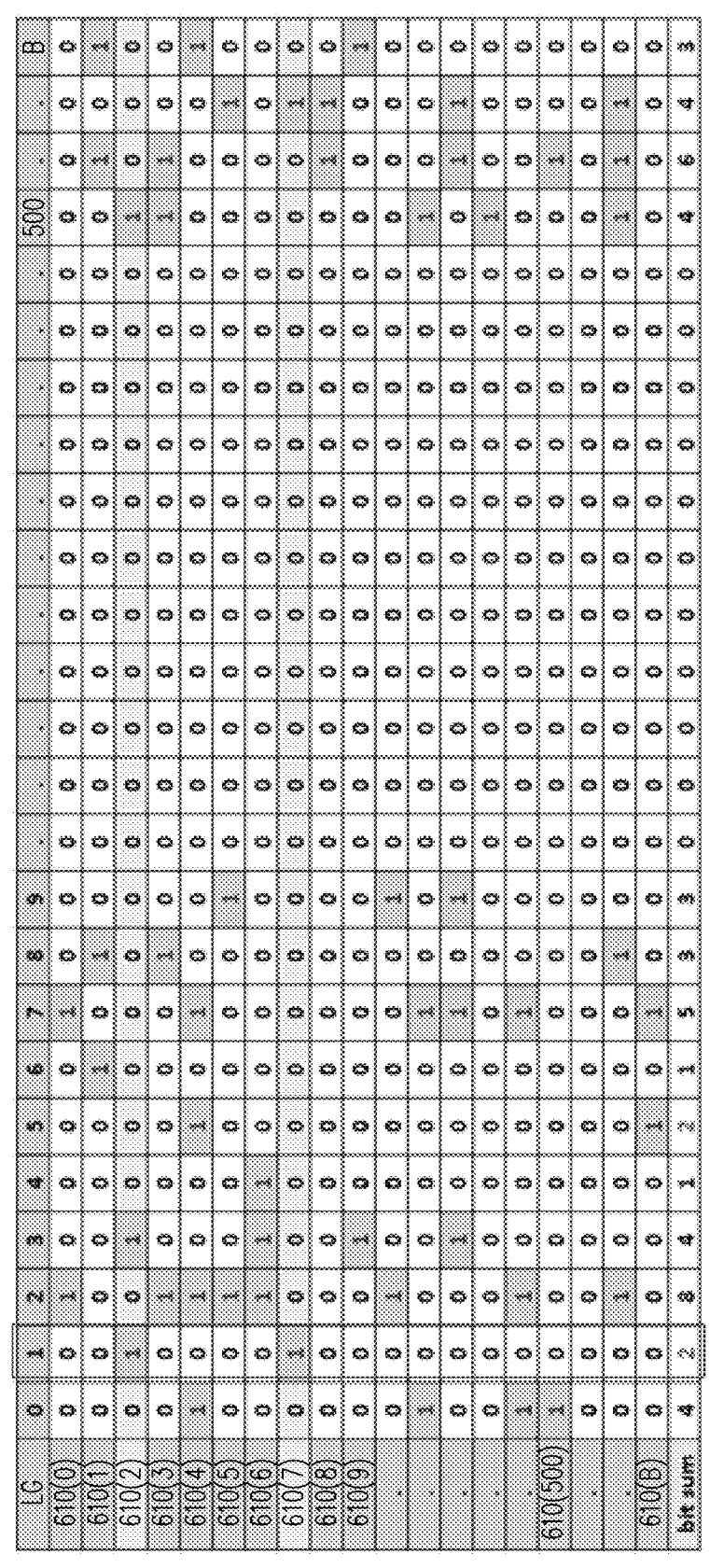

FIG. 7 is a schematic diagram illustrating establishment of a logical address group bit map according to an exemplary embodiment of the invention.

With reference to FIG. 7, in an exemplary embodiment, the MMC 502 allocates a plurality of LAs to be mapped to PPUs of the PEU 610(0) to the PEU 610(B) of the RNVM module 406 and groups the LAs into LAGs LG(0), LG(1), LG(2) . . . LG(B). A size of each LAG among the LAG LG(0) to the LAG LG(B) is identical to a capacity of one PEU. For instance, if the capacity of one PEU is 72 MB, an LA 0-72 MB belongs to the LAG LG(0), an LA 72 MB-144 MB belongs to the LAG LG(1), an LA 144 MB-216 MB belongs to the LAG LG(2), and the rest may be deduced by analogy.

The MMC 502 receives a plurality of write commands and a plurality of pieces of data to be stored to the LAs from the host system 11 and writes the data into the PPUs of the PEU 610(0) to the PEU 610(B).

The MMC 502 records a data WT of each PEU among the PEU 610(0) to the PEU 610(B), and the MMC 502 records a bit sum of each of the LAGs. The MMC 502 calculates a number of the PEUs writing data belonging to each of the LAGs and sets the number of the PEUs writing the data belonging to each of the LAGs as the bit sum of each of the LAGs. In an exemplary embodiment, the number of at least one PEU writing data belonging to the LAG LG(0) is a bit sum of the LAG LG(0). The number of the PEUs writing data belonging to the LAG LG(0) is 4, and that the bit sum of the LAG LG(0) is 4.

In an exemplary embodiment, when writing data belonging to a corresponding LAG among the LAGs, each of the PEUs among the PEU 610(0) to the PEU 610(B) records WMs of at least one PEU writing the data belonging to the corresponding LAG as 1.

For instance, when writing data belonging to the LAGs LG(2) and LG(7) in the PEU 610(0), the MMC 502 records WMs of the PEU 610(0) writing data belonging to the LAGs LG(2) and LG(7) as 1. That is, the data written into the PEU 610(0) is written into the LA 144 MB-216 MB and the LA 503 MB-576 MB. Herein, the MMC 502 records WMs of the PEU 610(0) writing data belonging to the LAGs except the LAGs LG(2) and LG(7) as 0.

For another instance, when writing the data belonging to the LAGs LG(1), LG(3), and LG(500) in the PEU 610(2), the MMC 502 records WMs of the PEU 610(2) writing data belonging to the LAGs LG(1), LG(3), and LG(500) as 1. That is, the data written into the PEU 610(2) is written into the LA 72 MB-144 MB, the LA 216 MB-288 MB, and the LA 72*500 MB-72*501 MB. Herein, the MMC 502 records WMs of the PEU 610(2) writing data belonging to the LAGs except the LAGs LG(1), LG(3), and LG(500) as 0.

By analogy, when respectively writing data belonging to the LAGs LG(0) to LG(B) in the PEU 610(0) to the PEU 610(B), the MMC 502 records WMs of a PEU writing data belonging to the LAGs LG(0) and LG(B). In this way, a LAG bit map as shown in FIG. 7 is established. More particularly, according to the LAG bit map shown in FIG. 7, the WMs of the PEUs respectively writing the data belonging to the LAGs LG(0) to LG(B) in the PEUs 610(0) to 610(B) can be obtained.

In an exemplary embodiment, the MMC 502 adds up values of the WMs of the at least one PEU writing data belonging to the corresponding LAG to be treated as a bit sum of the corresponding LAG. Adding up the PEUs writing the data belonging to the LAG LG(1) is taken as an example. The MMC 502 records WMs of the PEUs 610(2) and 610(7) writing the data belonging to the LAG LG(1) as 1 and adds up values of the WMs of the PEUs 610(2) and 610(7) writing the data belonging to the LAG LG(1) to be treated as a bit sum of the LAG LG(1). Therefore, the bit sum of the LAG LG(1) is 2. That is, the bit sum indicates that data written into this LAG LG(1) is distributed on the PEUs 610(2) and 610(7).

Similarly, adding up the PEUs writing data belonging to the LAG LG(4) is taken as an example. The MMC 502 records WMs of the PEUs 610(6) writing the data belonging to the LAG LG(4) as 1 and adds up values of the WMs of the PEU 610(6) writing the data belonging to the LAG LG(4) to be treated as a bit sum of the LAG LG(4). Therefore, the bit sum of the LAG LG(4) is 1. That is, the bit sum indicates that data written into this LAG LG(4) is distributed only on the PEU 610(6). By analogy, the MMC 502 adds up the values of the WMs of at least one PEU writing data belonging to the corresponding LAG to be treated as the bit sum of the corresponding LAG.

Figure 8:
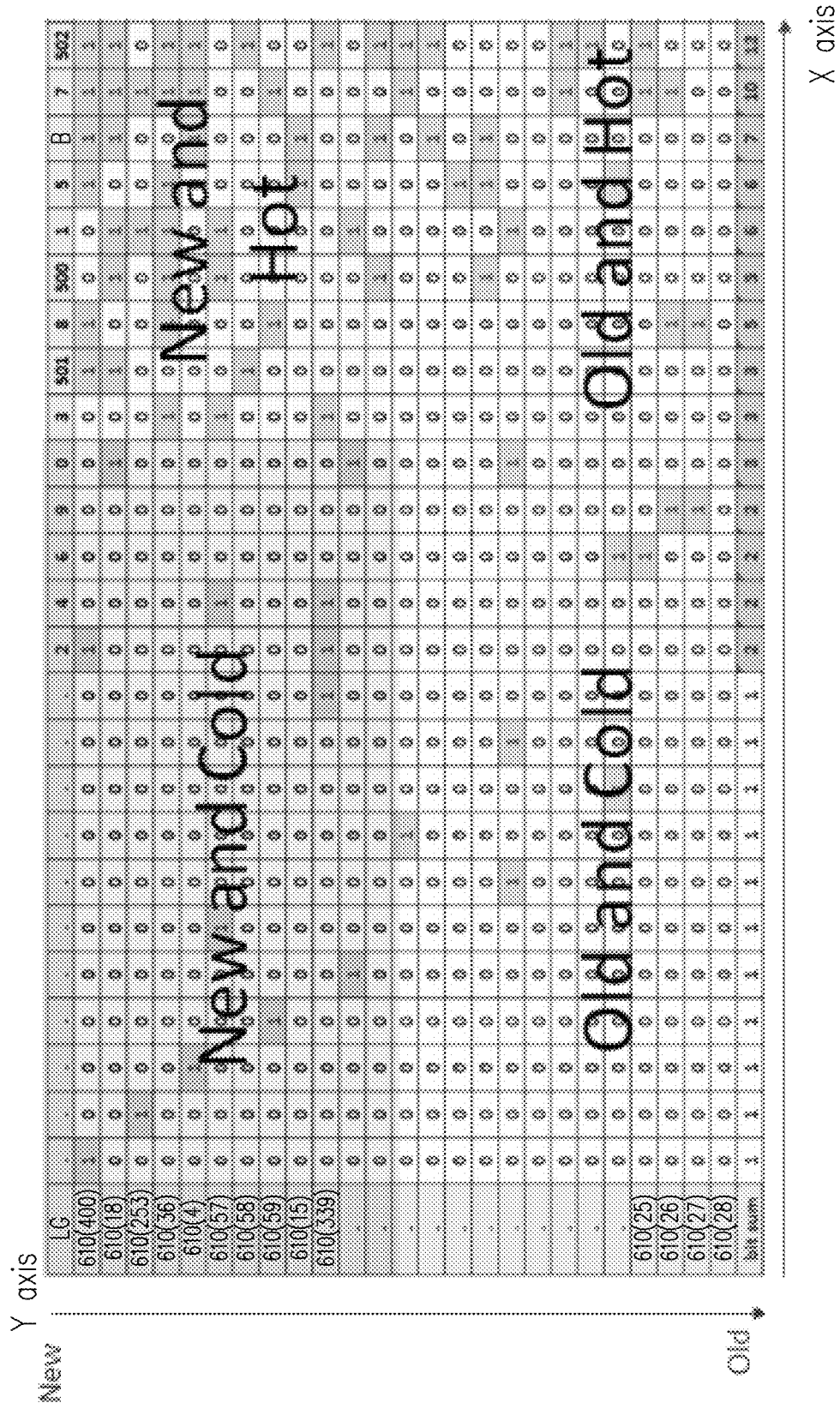
FIG. 8 is a schematic diagram illustrating reorganization of the logical address group bit map according to an exemplary embodiment of the invention.

FIG. 8 is a schematic diagram illustrating reorganization of the LAG bit map according to an exemplary embodiment of the invention.

With reference to FIG. 8, in the LAG bit map, the MMC 502 sorts the WMs belonging to each of the LAGs and corresponding to the PEUs on a first axis according to the bit sum of each of the LAGs. Further, the MMC 502 also sorts the WMs belonging to each of the LAGs and corresponding to the PEUs on a second axis according to the data WT of each of the PEUs. In an exemplary embodiment, the first axis is configured as the X axis, and the second axis is configured as the Y axis.

In an exemplary embodiment, the MMC 502 sorts the WMs belonging to each of the LAGs and corresponding to the PEUs according to an order of the values of the bit sums of the LAGs from the least value to the greatest value in the X axis direction.

In addition, the MMC 502 also sorts the WMs belonging to each of the LAGs and corresponding to the PEUs according to an order of the data WTs of the PEUs from the earliest data WT to the latest data WT in the Y axis direction. That is, the WMs with earlier (old) data WTs and belonging to each of the LAGs and corresponding to the PEUs are arranged at the lower half of the Y axis, and the WMs with later (new) data WTs and belonging to each of the LAGs and corresponding to the PEUs are arranged at the upper half of the Y axis.

In this way, the MMC 502 sorts the WMs belonging to each of the LAGs and corresponding to the PEUs according to the bit sum of each of the LAGs and the data WT of each of the PEUs, so as to reorganize the LAG bit map. In the reorganized LAG bit map, the data with the earlier (old) data WTs, written in the same LAG, and distributed in less PEUs (i.e., the bit sum of each of the LAGs is less) is identified as a first type data. In this exemplary embodiment, the first type data is cold data (old and cold data). In contrast, the MMC 502 identifies the data with the later data WTs (i.e., the newer data WTs), written in the same LAG, distributed in more PEUs (i.e., the bit sum of each of the LAGs is greater) as non-cold data. Herein, the MMC 502 may categorize the non-cold data into new and cold data belonging to a second data type, new and hot data belonging to a third data type, and old and hot data belonging to a fourth data type according to the bit sum of each of the LAGs and the data WT of each of the PEUs, which is not limited by the disclosure in this regard.

In an exemplary embodiment, if the bit sum of the LAG LG(1) is less than a bit sum threshold value and the data WT of at least one PEU writing data belonging to the LAG LG(1) among the PEUs is less than a timestamp threshold value, the MMC 502 identifies the data belonging to the LAG LG(1) as the cold data. In this exemplary embodiment, the bit sum threshold value may be set to be 7, and the timestamp threshold value may be set to be one-half of the number of the PEUs. When the MMC 502 determines that the bit sum of the LAG LG(1) is 2 and this bit sum is less than the bit sum threshold value and the data WTs of the PEUs 610(2) and 610(7) are less than the timestamp threshold value, the MMC 502 identifies the data belonging to the LAG LG(1) as the cold data, and the MMC 502 activates a data reorganization operation for the cold data.

Figure 9:
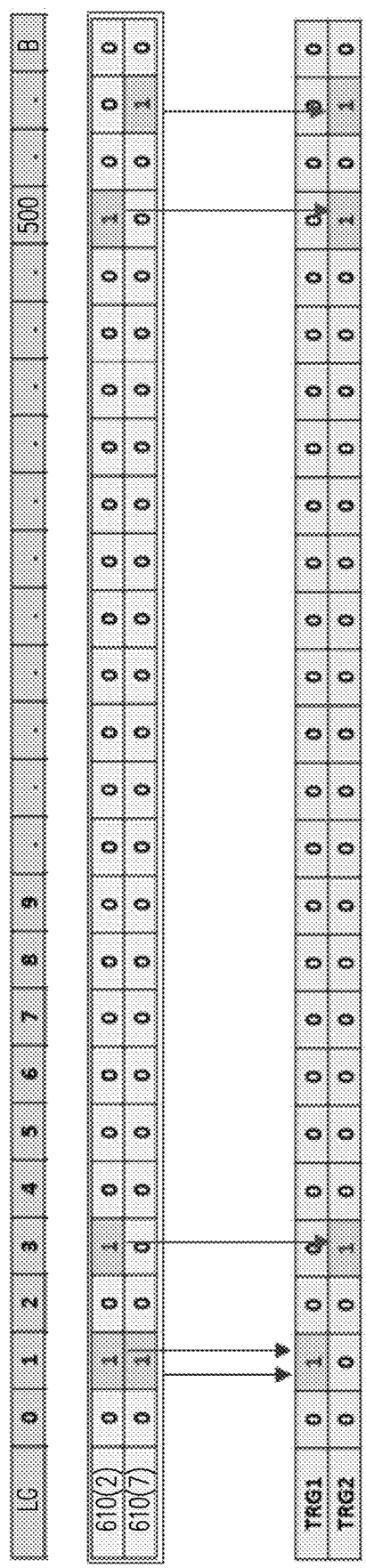
FIG. 9 is a schematic diagram illustrating activation of a data reorganization operation for cold data according to an exemplary embodiment of the disclosure.

FIG. 9 is a schematic diagram illustrating activation of a data reorganization operation for cold data according to an exemplary embodiment of the disclosure.

Referring to FIG. 9, in an exemplary embodiment, when the MMC 502 identifies that the data belonging to the LAG LG(1) belongs to the cold data, the MMC 502 retrieves a target PEU TRG1 from the spare region 602 and moves the data belonging to the LAG LG(1) from the PEU 610(2) and the PEU 610(7) to the target PEU TRG1.

In another exemplary embodiment, the MMC 502 retrieves a target PEU TRG2 from the spare region 602 and moves the data not belonging to the LAG LG(1) from the PEUs 610(2) and 610(7) to the target PEU TRG2. The target PEUs TRG1 and TRG2 are retrieved from the spare region 602 and are configured to replace empty PEUs.

Figure 10:
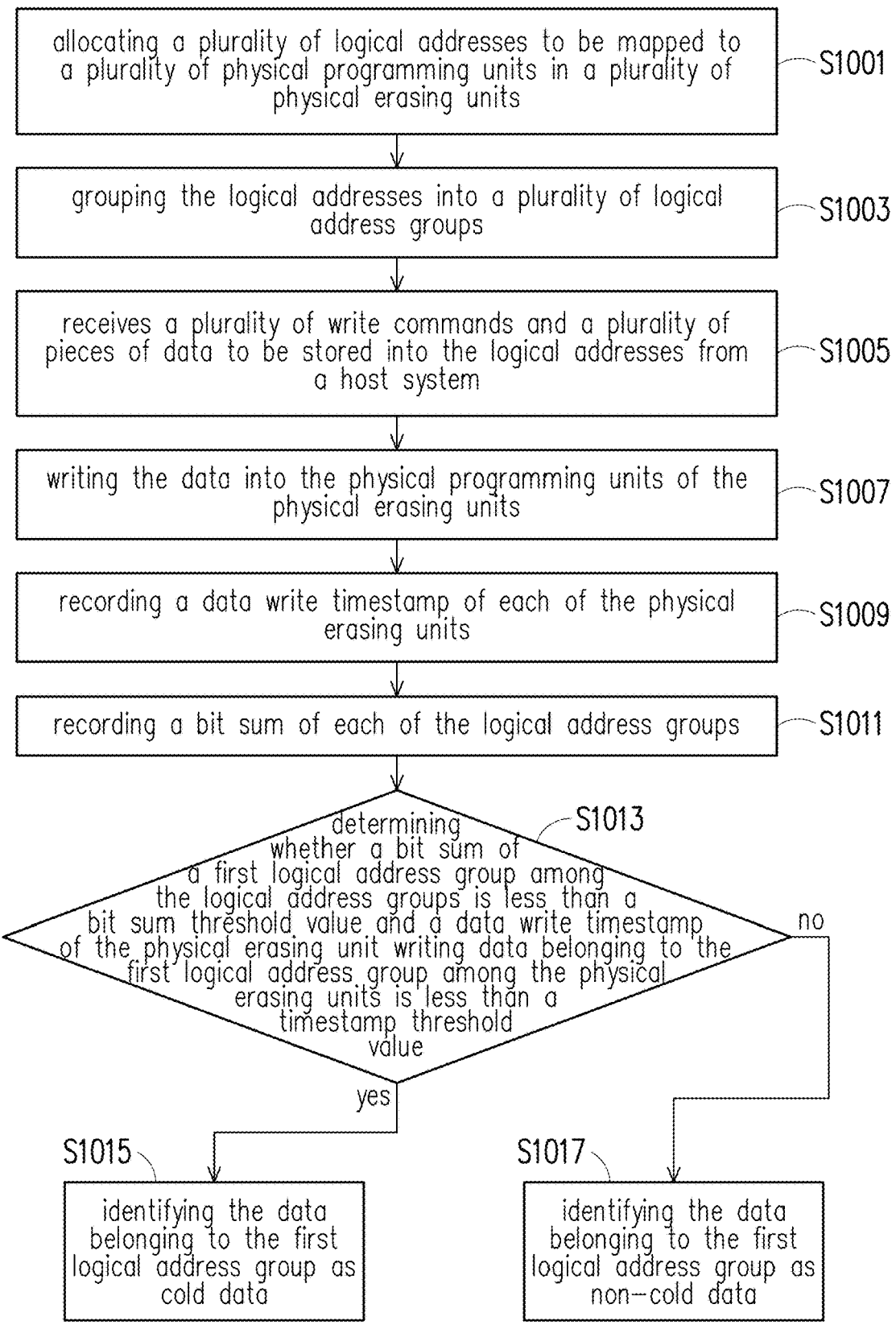
FIG. 10 is a schematic flow chart illustrating identification of the cold data according to an exemplary embodiment of the disclosure.

FIG. 10 is a schematic flow chart illustrating identification of the cold data according to an exemplary embodiment of the disclosure.

Referring to FIG. 10, in step S1001, the MMC 502 allocates a plurality of LAs to be mapped to a plurality of PPUs in a plurality of PEUs.

In step S1003, the MMC 502 groups the LAs into a plurality of LAGs. In an exemplary embodiment, the MMC 502 groups the LAs into LAGs LG(0), LG(1), LG(2) . . . , and LG(B). A size of each of the LAGs is identical to a capacity of one PEU.

In step S1005, the MMC 502 receives a plurality of write commands and a plurality of pieces of data to be stored into the LAs from the host system 11.

In step S1007, the MMC 502 writes the data into PPUs of the PEU 610(0) to the PEU 610(B).

In step S1009, the MMC 502 records a data WT of each of the PEUs.

In step S1011, the MMC 502 records a bit sum of each of the LAGs. In an exemplary embodiment, the MMC 502 calculates a number of the PEUs writing data belonging to each of the LAGs and sets the number of the PEUs writing data belonging to each of the PEUs as the bit sum of each of the LAGs.

In step S1013, the MMC 502 determines whether a bit sum of a first LAG among the LAGs is less than a bit sum threshold value and a data WT of the PEU writing data belonging to the first LAG among the PEUs is less than a timestamp threshold value. In an exemplary embodiment, the timestamp threshold value is set to be one-half of the number of the PEUs.

In step S1015, if the bit sum of the first LAG is less than the bit sum threshold value and the data WT of the PEUs writing the data belonging to the first LAG is less than the timestamp threshold value, the MMC 502 identifies the data belonging to the first LAG as cold data.

In step S1017, if the bit sum of the first LAG is not less than the bit sum threshold value and the data WT of the PEU writing the data belonging to the first LAG is not less than the timestamp threshold value, the MMC 502 identifies the data belonging to the first LAG as non-cold data.

Figure 11:
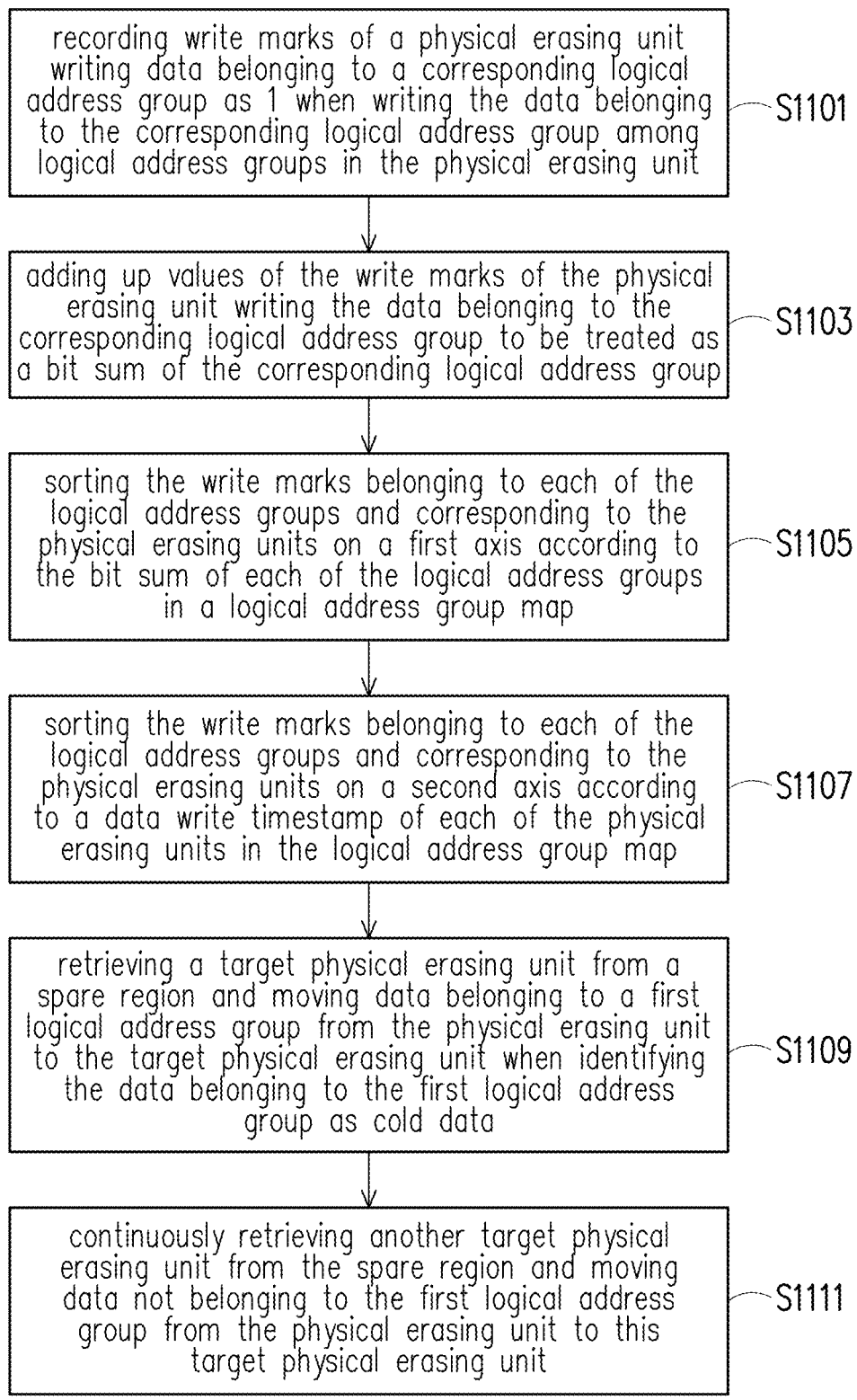
FIG. 11 is a schematic flow chart illustrating activation of the data reorganization operation for the cold data according to an exemplary embodiment of the disclosure.

FIG. 11 is a schematic flow chart illustrating activation of the data reorganization operation for the cold data according to an exemplary embodiment of the disclosure.

With reference to FIG. 11, in step S1101, when writing data belonging to a corresponding LAG among LAGs in a PEU, the MMC 502 records WMs of the PEU writing the data belonging to the corresponding LAG as 1.

In step S1103, the MMC 502 adds up values of the WMs of the PEU writing the data belonging to the corresponding LAG to be treated as a bit sum of the corresponding LAG.

In step S1105, in a LAG bit map, the MMC 502 sorts the WMs belonging to each of the LAGs and corresponding to the PEUs on a first axis according to the bit sum of each of the LAGs.

In step S1107, in the LAG bit map, the MMC 502 sorts the WMs belonging to each of the LAGs and corresponding to the PEUs on a second axis according to a data WT of each of the PEUs.

In step S1109, when identifying data belonging to a first LAG as cold data, the MMC 502 retrieves a target PEU from the spare region 602 and moves the data belonging to the first LAG from the PEU to the target PEU.

In step S1111, the MMC 502 continuously retrieves another target PEU from the spare region 602 and moves data not belonging to the first LAG from the PEU to this target PEU. In this way, in the following data processing process, such cold data may be read on one PEU, so that an access speed is thereby increased.

In view of the foregoing, the disclosure provides a data storage method, a memory storage apparatus, and a memory control circuit unit. In the method, data is identified whether to be the cold data according to the bit sums of the LAGs and the data WTs of the PEUs writing the data belonging to the LAGs. The data reorganization operation is then activated for the cold data. As such, the cold data may be moved to another PEU, and therefore, in the following data processing process, the cold data may be directly read on this PEU, and efficiency of accessing the cold data is effectively increased.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A data storage method, configured for a rewritable non-volatile memory module, wherein the rewritable non-volatile memory module has a plurality of physical erasing units, and the data storage method comprises:
    allocating a plurality of logical addresses to be mapped to a plurality of physical programming units of the physical erasing units;
    grouping the logical addresses into a plurality of logical address groups;
    receiving a plurality of write commands and a plurality of pieces of data to be stored into the logical addresses from a host system;
    writing the data into the physical programming units of the physical erasing units respectively; and
    identifying data of the physical erasing unit of a first logical address group among the logical address groups is a first type data according to a data write timestamp of each of the physical erasing units and a bit sum of each of the logical address groups, wherein the bit sum of each of the logical address groups is set according to the number of the physical erasing units written the data belonging to each of the logical address groups and the bit sum of the first logical address group is a number of the at least one physical erasing unit writing the data belonging to the first logical address group.

2. The data storage method as claimed in claim 1, further comprising:
    recording the data write timestamp of each of the physical erasing units;
    recording the bit sum of each of the logical address groups; and
    identifying the data of the physical erasing unit belonging to the first logical address group as the first type data if the bit sum of the first logical address group among the logical address groups is less than a bit sum threshold value and the data write timestamp of at least one physical erasing unit writing data belonging to the first logical address group among the physical erasing units is less than a timestamp threshold value.

3. The data storage method as claimed in claim 1, further comprising:
    establishing a logical address group bit map for recording the physical erasing units writing the data belonging to each of the logical address groups, wherein each of the logical address groups has a plurality of write marks, and the write marks correspond to the physical erasing units respectively; and recording the write marks of the at least one physical erasing unit writing data belonging to a corresponding logical address group as 1 when the physical erasing units write the data belonging to the corresponding logical address group among the logical address groups.

4. The data storage method as claimed in claim 3, wherein the step of recording the bit sum of each of the logical address groups comprises:

adding up values of the write marks of the at least one physical erasing unit writing the data belonging to the corresponding logical address group to be treated as the bit sum of the corresponding logical address group.

5. The data storage method as claimed in claim 4, further comprising:

sorting the write marks belonging to each of the logical address groups and corresponding to the physical erasing units on a first axis according to the bit sum of each of the logical address groups in the logical address group bit map; and sorting the write marks belonging to each of the logical address groups and corresponding to the physical erasing units on a second axis according to the data write timestamp of each of the physical erasing units.

6. The data storage method as claimed in claim 5, further comprising:

retrieving a target physical erasing unit from a spare region if the data belonging to the first logical address group is identified as the first type data, moving the data belonging to the first logical address group from the at least one physical erasing unit to the target physical erasing unit.

7. The data storage method as claimed in claim 1, wherein the timestamp threshold value is configured to be one-half of a number of the physical erasing units, and the bit sum threshold value is configured to be 7.

8. The data storage method as claimed in claim 1, wherein a size of each of the logical address groups is identical to a capacity of one physical erasing unit.

9. A memory control circuit unit, configured for a rewritable non-volatile memory module, the memory control circuit unit comprising:

a host interface, configured to be coupled to a host system;

a memory interface, configured to be coupled to the rewritable non-volatile memory module, wherein the rewritable non-volatile memory module has a plurality of physical erasing units; and a memory management circuit, coupled to the host interface and the memory interface, wherein the memory management circuit is configured to allocate a plurality of logical addresses to be mapped to a plurality of physical programming units of the physical erasing units, wherein the memory management circuit is configured to group the logical addresses into a plurality of logical address groups, wherein the memory management circuit is configured to receive a plurality of write commands and a plurality of pieces of data to be stored into the logical addresses from a host system, wherein the memory management circuit is configured to write the data into the physical programming units of the physical erasing units respectively; and wherein the memory management circuit is configured to identify data of the physical erasing unit of a first logical address group among the logical address groups is a first type data according to a data write timestamp of each of the physical erasing units and a bit sum of each of the logical address groups, wherein the bit sum of each of the logical address groups is set according to the number of the physical erasing units written the data belonging to each of the logical address groups and the bit sum of the first logical address group is a number of the at least one physical erasing unit writing the data belonging to the first logical address group.

10. The memory control circuit unit as claimed in claim 9, wherein the memory management circuit is further configured to record a data write timestamp of each of the physical erasing units, the memory management circuit is further configured to record a bit sum of each of the logical address groups, and the memory management circuit is further configured to identify the data of the physical erasing unit belonging to the first logical address group as the first type data if the bit sum of the first logical address group among the logical address groups is less than a bit sum threshold value and the data write timestamp of at least one physical erasing unit writing data belonging to the first logical address group among the physical erasing units is less than a timestamp threshold value.

11. The memory control circuit unit as claimed in claim 9, wherein the memory management circuit is further configured to establish a logical address group bit map for recording the physical erasing units writing the data belonging to each of the logical address groups, wherein each of the logical address groups has a plurality of write marks, and the write marks correspond to the physical erasing units respectively, the memory management circuit is further configured to record the write marks of the at least one physical erasing unit writing data belonging to a corresponding logical address group as 1 when the physical erasing units write the data belonging to the corresponding logical address group among the logical address groups.

12. The memory control circuit unit as claimed in claim 11, wherein the operation of the memory management circuit recording the bit sum of each of the logical address groups further comprises:

the memory management circuit is further configured to add up values of the write marks of the at least one physical erasing unit writing the data belonging to the corresponding logical address group to be treated as the bit sum of the corresponding logical address group.

13. The memory control circuit unit as claimed in claim 12, wherein the memory management circuit is further configured to sort the write marks belonging to each of the logical address groups and corresponding to the physical erasing units on a first axis according to the bit sum of each of the logical address groups in the logical address group bit map, and the memory management circuit is further configured to sort the write marks belonging to each of the logical address groups and corresponding to the physical erasing units on a second axis according to the data write timestamp of each of the physical erasing units.

14. The memory control circuit unit as claimed in claim 13, wherein the memory management circuit is further configured to retrieve a target physical erasing unit from a spare region if the data belonging to the first logical address group is identified as the first type data and move the data belonging to the first logical address group from the at least one physical erasing unit to the target physical erasing unit.

15. A memory storage apparatus, comprising:
a connection interface unit, configured to be coupled to a host system;
a rewritable non-volatile memory module, wherein the rewritable non-volatile memory module has a plurality of physical erasing units; and
a memory control circuit unit, coupled to the connection interface unit and the rewritable non-volatile memory module,
wherein the memory control circuit unit is configured to allocate a plurality of logical addresses to be mapped to a plurality of physical programming units of the physical erasing units,
wherein the memory control circuit unit is configured to group the logical addresses into a plurality of logical address groups,
wherein the memory control circuit unit is configured to receive a plurality of write commands and a plurality of pieces of data to be stored into the logical addresses from a host system,
wherein the memory control circuit unit is configured to write the data into the physical programming units of the physical erasing units respectively,
wherein the memory control circuit unit is configured to identify data of the physical erasing unit of a first logical address group among the logical address groups is a first type data according to a data write timestamp of each of the physical erasing units and a bit sum of each of the logical address groups, wherein the bit sum of each of the logical address groups is set according to the number of the physical erasing units written the data belonging to each of the logical address groups and the bit sum of the first logical address group is a number of the at least one physical erasing unit writing the data belonging to the first logical address group.

16. The memory storage apparatus as claimed in claim 15, further comprising:
wherein the memory control circuit unit is further configured to record a data write timestamp of each of the physical erasing units,
wherein the memory control circuit unit is further configured to record a bit sum of each of the logical address groups,
the memory control circuit unit is further configured to identify the data belonging to the first logical address group as the first type data if the bit sum of the first logical address group among the logical address groups is less than a bit sum threshold value and the data write timestamp of at least one physical erasing unit writing data belonging to the first logical address group among the physical erasing units is less than a timestamp threshold value.

17. The memory storage apparatus as claimed in claim 15, further comprising:
the memory control circuit unit is further configured to establish a logical address group bit map for recording the physical erasing units writing the data belonging to each of the logical address groups, wherein each of the logical address groups has a plurality of write marks, and the write marks correspond to the physical erasing units respectively,
the memory control circuit unit is further configured to record the write marks of the at least one physical erasing unit writing data belonging to a corresponding logical address group as 1 when the physical erasing units write the data belonging to the corresponding logical address group among the logical address groups.

18. The memory storage apparatus as claimed in claim 17, wherein the operation of the memory control circuit unit recording the bit sum of each of the logical address groups comprises:
the memory control circuit unit is further configured to add up values of the write marks of the at least one physical erasing unit writing the data belonging to the corresponding logical address group to be treated as the bit sum of the corresponding logical address group.

19. The memory storage apparatus as claimed in claim 18, further comprising:
the memory control circuit unit is further configured to sort the write marks belonging to each of the logical address groups and corresponding to the physical erasing units on a first axis according to the bit sum of each of the logical address groups in the logical address group bit map, and
the memory control circuit unit is further configured to sort the write marks belonging to each of the logical address groups and corresponding to the physical erasing units on a second axis according to the data write timestamp of each of the physical erasing units.

20. The memory storage apparatus as claimed in claim 19, further comprising:
the memory control circuit unit is further configured to retrieve a target physical erasing unit from a spare region if the data belonging to the first logical address group is identified as the first type data and move the data belonging to the first logical address group from the at least one physical erasing unit to the target physical erasing unit.

* * * * *